US009727137B2

(12) United States Patent
Choi et al.

(10) Patent No.: US 9,727,137 B2
(45) Date of Patent: Aug. 8, 2017

(54) USER VIEW POINT RELATED IMAGE PROCESSING APPARATUS AND METHOD THEREOF

(71) Applicant: FXGear Inc., Seoul (KR)

(72) Inventors: Kwang Jin Choi, Seoul (KR); Yeong Jun Park, Goyang-si (KR); Kyung Kun Na, Seoul (KR)

(73) Assignee: FXGear Inc., Seoul (KR)

( * ) Notice: Subject to any disclaimer, the term of this patent is extended or adjusted under 35 U.S.C. 154(b) by 258 days.

(21) Appl. No.: 14/610,152

(22) Filed: Jan. 30, 2015

(65) Prior Publication Data

US 2015/0220143 A1    Aug. 6, 2015

(30) Foreign Application Priority Data

Feb. 3, 2014    (KR) .......................... 10-2014-0012135

(51) Int. Cl.
*G06F 3/01*    (2006.01)

(52) U.S. Cl.
CPC ............. *G06F 3/013* (2013.01); *G06F 3/011* (2013.01)

(58) Field of Classification Search
CPC ................................. G06F 3/013; G06F 3/011
See application file for complete search history.

(56) References Cited

U.S. PATENT DOCUMENTS

2005/0285875 A1    12/2005    Kang et al.
2013/0023342 A1*    1/2013    Jung ....................... G06F 3/011
                                                                463/32

FOREIGN PATENT DOCUMENTS

| EP | 1 612 732 A2 | 1/2006 |
| JP | 2009-5044 A | 1/2009 |
| KR | 10-2006-0048551 A | 5/2006 |
| KR | 10-2008-0022544 A | 3/2008 |
| KR | 10-2013-0010424 A | 1/2013 |
| WO | WO 2007/002845 A2 | 1/2007 |

* cited by examiner

*Primary Examiner* — Andrew Sasinowski
(74) *Attorney, Agent, or Firm* — Fenwick & West LLP

(57) ABSTRACT

A user viewpoint related image processing apparatus includes: a sensor unit configured to sense a viewpoint change of a user and generate motion data, a communication interface unit configured to receive an image package including image data from a media server, a scene constructing unit configured to, using the image package, place a virtual camera in a virtual space and construct a scene for the image data, and a virtual camera pose changing unit configured to, using the motion data, change a pose of the placed virtual camera to respond to the viewpoint change of the user.

16 Claims, 15 Drawing Sheets

USER VIEW POINT RELATED IMAGE PROCESSING APPARATUS AND METHOD THEREOF

CROSS-REFERENCE TO RELATED APPLICATION

This application claims priority to Korean Patent Application No. 10-2014-0012135, filed on Feb. 3, 2014, and all the benefits accruing therefrom under 35 U.S.C. §119, the contents of which in its entirety are herein incorporated by reference.

BACKGROUND

1. Field

Embodiments relate to an image processing apparatus and method, and more particularly, to a user viewpoint related image processing apparatus and method that senses a viewpoint movement of a user using various sensors and changes a part of an image being provided to the user in response to the viewpoint change of the user.

2. Description of the Related Art

In capturing an image using an optical device such as a camera and displaying the captured image, a user may view an image of which a full scene is not within the field of view of the user. Such image is called a wide viewing angle image. Generally, for the user to see an area with a larger field of view than the field of view of the user, the user needs to move a part of the image being displayed.

In this case, conventionally, a user had to change the part of the image being displayed through a keyboard or touch manipulation. However, this is inconvenient in that the user is required to perform a specific input activity.

SUMMARY

To address the above issue, a method for changing a part of an image being displayed to an orientation or location intended by a user without a separate manipulation activity may be provided.

A user viewpoint related image processing apparatus according to an embodiment includes a sensor unit configured to sense a viewpoint change of a user and generate motion data, a communication interface unit configured to receive an image package including image data from a media server, a scene constructing unit configured to, using the image package, place a virtual camera in a virtual space and construct a scene for the image data, and a virtual camera pose changing unit configured to, using the motion data, change a pose of the placed virtual camera to respond to the viewpoint change of the user.

Also, in the user viewpoint related image processing apparatus, the pose of the virtual camera may include an orientation or a location of the virtual camera.

Also, in the user viewpoint related image processing apparatus, the sensor unit configured to sense the viewpoint change of the user may include at least one of a gyro sensor, an acceleration sensor, an inertial measurement unit (IMU) sensor, a global positioning system (GPS) sensor, and a vision sensor.

Also, in the user viewpoint related image processing apparatus, the image package may further include a camera parameter for the pose change of the virtual camera, and the camera parameter may be a parameter of a real camera which captured an image of the image data.

Also, in the user viewpoint related image processing apparatus, the virtual camera pose changing unit may change the pose of the placed camera using the motion data and the camera parameter.

Also, in the user viewpoint related image processing apparatus, the image data may include at least one of a wide viewing angle streaming image and a stereoscopic 3D (S3D) image.

Also, the user viewpoint related image processing apparatus may further include a projection geometry generating unit configured to generate projection geometry for output of a wide viewing angle image using a camera parameter of a real camera which captured an image of the image data, and the projection geometry generating unit may calibrate vertices or texture coordinates of reference geometry using the camera parameter and transform the calibrated reference geometry into a shape of curved surface to generate the projection geometry.

Also, in the user viewpoint related image processing apparatus, the camera parameter may include at least one of a camera lens parameter, a camera stabilization parameter, and a stereo camera rig misalignment calibration parameter.

Also, in the user viewpoint related image processing apparatus, the scene constructing unit may calibrate the scene by dynamically adjusting a location of the virtual camera using the camera stabilization parameter.

Also, the user viewpoint related image processing apparatus may further include an image rendering unit configured to render in real time at least a portion of the scene being seen by the virtual camera in the changed camera pose and display a rendered image on a display unit.

A user viewpoint related image providing media server according to an embodiment includes an image package storage unit configured to store an image package including image data and a camera parameter for pose change of a virtual camera, and a communication interface unit configured to transmit the image package to other terminal, wherein the camera parameter is a parameter of a real camera which captured an image of the image data.

Also, in the user viewpoint related image providing media server, the pose of the virtual camera may include an orientation or a location of the virtual camera.

Also, in the user viewpoint related image providing media server, the image data may include at least one of a wide viewing angle streaming image and a S3D image.

Also, in the user viewpoint related image providing media server, the camera parameter may include at least one of a camera lens parameter, a camera stabilization parameter, and a stereo camera rig misalignment calibration parameter.

A user viewpoint related image processing method according to an embodiment includes sensing a viewpoint change of a user by a sensor and generating motion data, receiving, by a communication interface unit, an image package including image data from a media server, placing, using the image package, a scene for the image data and a virtual camera in a virtual space, and changing, using the motion data, a pose of the placed virtual camera to respond to the viewpoint change of the user.

Also, in the user viewpoint related image processing method, the pose of the virtual camera may include an orientation or a location of the virtual camera.

Also, in the user viewpoint related image processing method, the image package may further include a camera parameter for the pose change of the virtual camera, and the camera parameter may be a parameter of a real camera which captured an image of the image data.

Also, in the user viewpoint related image processing method, the changing of the pose of the placed virtual camera may include changing the pose of the virtual camera using the motion data and the camera parameter.

Also, in the user viewpoint related image processing method, the image data may include at least one of a wide viewing angle streaming image and a S3D image.

Also, the user viewpoint related image processing method may further include rendering in real time at least a portion of the scene being seen by the virtual camera in the changed virtual camera pose and displaying it on a display unit.

DETAILED DESCRIPTION

Figure 1:
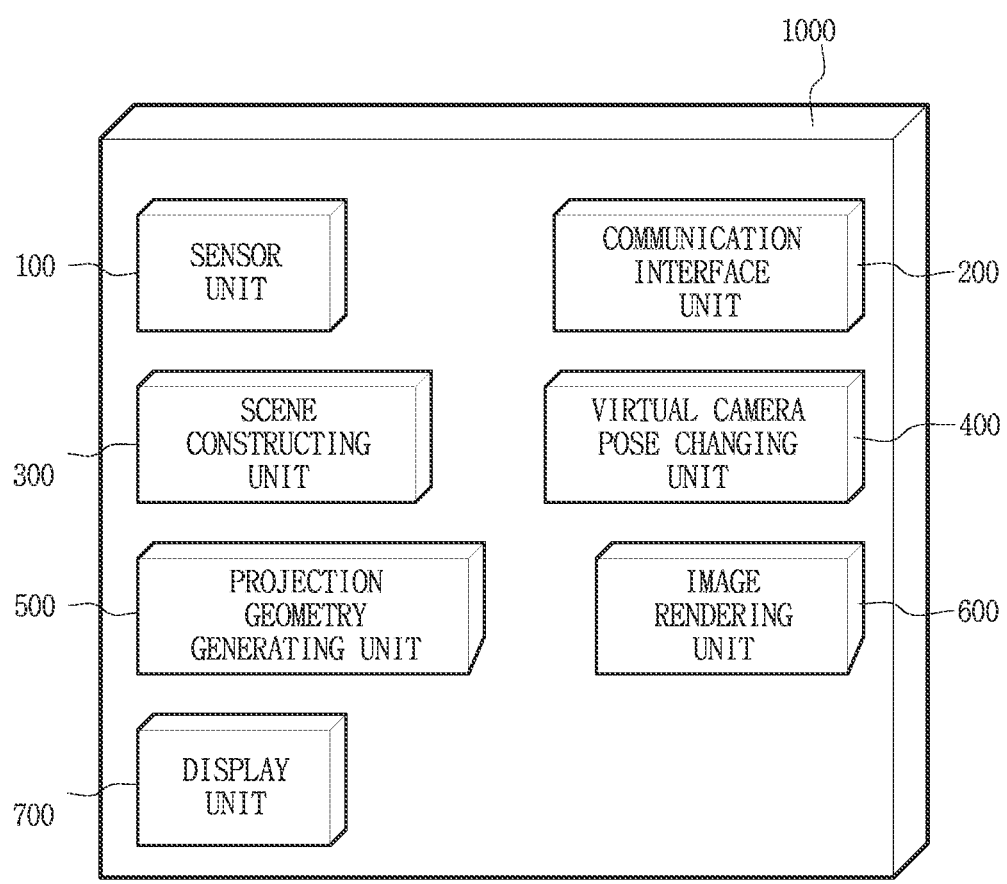
FIG. 1 is a block diagram illustrating a user viewpoint related image processing apparatus according to an embodiment.

The terminology used herein is for the purpose of describing particular embodiments only and is not intended to be limiting of the present disclosure. As used herein, the singular forms are intended to include the plural forms as well, unless the context clearly indicates otherwise. Furthermore, it should be understood that the use of the terms "comprises" and/or "comprising", or "includes" and/or "including" when used in this specification, specify the presence of stated features, integers, steps, operations, elements, components, and/or groups thereof, but do not preclude the presence or addition of one or more other features, integers, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. Like reference numerals presented in the drawings indicate like elements. However, in the description of exemplary embodiments, related known functions or constructions are not described in detail but omitted if they would obscure the general inventive concept with unnecessary detail. Also, in the drawings, the size of some of the elements may be exaggerated and not drawn on scale for illustrative purposes.

The embodiments described herein may take the form of entirely hardware, partially hardware and partially software, or entirely software. The term "unit", "module", "device" or "system" as used herein is intended to refer to a computer-related entity, either hardware, a combination of hardware and software, or software. For example, a unit, module, device or system as used herein can be, but is not limited to being, a process running on a processor, a processor, an object, an executable, a thread of execution, a program, and/or a computer. By way of illustration, both an application running on a computer and the computer can be a unit, module, device or system of the present disclosure.

The embodiments are described with reference to flow-charts presented in the drawings. For simplified description, the method is illustrated and described as a series of blocks, but the present disclosure is not limited to an order of the blocks, and some of the blocks may be placed with the other blocks in a different order from an order illustrated and described herein or may be concurrent with the other blocks, and a variety of different branches, flow paths, and block orders achieving a same or similar result may be implemented. Also, for implementation of the method described herein, all the blocks shown herein may not be required. Further, the method according an exemplary embodiment may be implemented in a form of a computer program for performing a series of processes, and the computer program may be recorded in a computer-readable recording medium.

Hereinafter, exemplary embodiments of the present disclosure will be described in detail with reference to the drawings.

FIG. 1 is a block diagram illustrating a user viewpoint related image processing apparatus according to an embodiment. Referring to FIG. 1, in one embodiment, the user viewpoint related image processing apparatus 1000 includes a sensor unit 100, a communication interface unit 200, a scene constructing unit 300, and a virtual camera pose changing unit 400. Also, in another embodiment, the user viewpoint related image processing apparatus 1000 may further include at least one of a projection geometry generating unit 500, an image rendering unit 600, and a display unit 700.

The sensor unit 100 senses a viewpoint change of a user, and generates motion data. Specifically, the sensor unit 100 may sense an orientation of the viewpoint of the user directs or a current location of the user, and may track the varying orientation or location. In one embodiment, the sensor unit 100 may include a gyro sensor, an acceleration sensor, an inertial measurement unit (IMU) sensor, a global positioning system (GPS) sensor, or a vision sensor, and may include a combination of at least one of the exemplary sensors. For example, the sensor unit 100 may sense the viewpoint change of the user using the vision sensor and the IMU sensor together. In this case, the sensor unit may use a method which unites coordinate systems by calibrating information obtained from the two sensors. The vision sensor may include a variety of sensors such as a charged coupled device (CCD) sensor or a pinned photo diode (PPD), a charge and injection device (CID), an active pixel sensor (APS) and an active column sensor (ACS), and may use an optical motion tracking technique.

In one embodiment, the motion data includes orientation information associated with the viewpoint change of the user in a reality space. In another embodiment, the motion data may further include location information associated with the viewpoint movement of the user. The motion data corresponds to fundamental data for changing an orientation or a location of a virtual camera existing in a virtual space.

Figure 2:
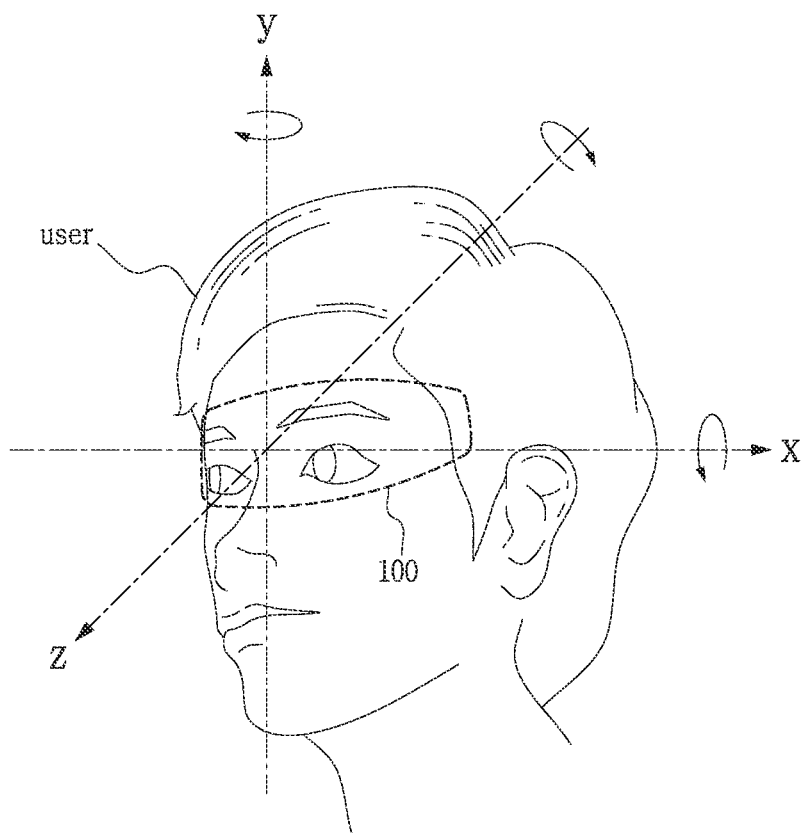
FIG. 2 is a diagram illustrating an operation of a sensor unit (100) according to an embodiment.

FIG. 2 is a diagram illustrating the operation of the sensor unit 100 according to an embodiment. Referring to FIG. 2, it is assumed that an orientation the user currently views is z axis. Also, when the user changes the orientation the user views by turning his/her head or moving the location, the sensor unit 100 may measure an amount of orientation (that is, viewpoint) the user views.

For making such measurements, as shown in FIG. 2, the sensor unit 100 may be attached to the head of the user. In another embodiment, the viewpoint of the user may be sensed using image data without attaching the sensor unit 100 to the body of the user. In still another embodiment, the sensor unit 100 may include a pupil tracking sensor, and the pupil tracking sensor may be placed near the eye of the user to capture an image of the pupil of the user and sense the viewpoint change of the user.

The communication interface unit 200 receives an image package including image data from a media server. The media server corresponds to a server which provides the image package to the user viewpoint related image processing apparatus 1000, and may possess various types of video contents. The media server may be a server used for YOU-TUBE®, GOOGLE®, and ITUNES® to provide multimedia content to the user. The communication interface unit 200 may receive the image package from the media server via a network. The network uses standard communication technologies/protocols. Thus, the network may include links using technologies such as Ethernet, 802.11, worldwide interoperability for microwave access (WiMAX), 2G/3G/4G, digital subscriber line (DSL), asynchronous transfer mode (ATM), infiniband, and PCI express advanced switching. Similarly, the networking protocols used on the network include multiprotocol label switching (MPLS), transmission control protocol/Internet protocol (TCP/IP), user datagram protocol (UDP), hypertext transport protocol (HTTP), simple mail transfer protocol (SMTP), and file transfer protocol (FTP). Data exchanged on the network may be displayed using technologies and/or formats including image data in binary form, for example, portable network graphics (PNG), hypertext markup language (HTML), and extensible markup language (XML). Additionally, all or a part of the links may be encrypted using traditional encryption technology such as secure sockets layer (SSL), transport layer security (TLS), virtual private networks (VPNs), and Internet protocol security (IPsec).

Figure 3:
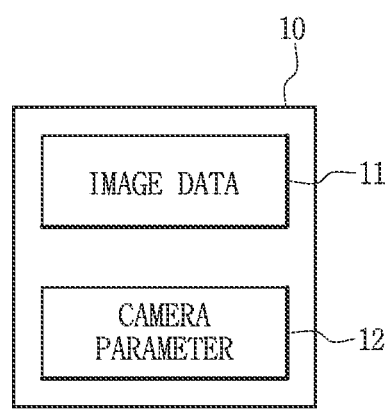
FIG. 3 is a conceptual diagram illustrating a configuration of an image package (10) according to an embodiment.

FIG. 3 is a conceptual diagram illustrating a configuration of the image package 10 according to an embodiment. Referring to FIG. 3, the image package 10 may include image data 11 and a camera parameter 12. For example, the image package may be an electronic file.

The image data 11 represents a content of the media content being provided to the user. For example, the image data 11 may include at least one of a streaming image and a stereoscopic 3D (S3D) image, and the image may be a wide viewing angle image. The image data 11 may be used to visually provide the image to the user after it is rendered. In one embodiment, the image package 10 may further include a camera parameter 12 for pose change of the virtual camera. The camera parameter is a parameter of a real camera which captured the image of the image data 11, and may include at least one of a camera lens parameter, a camera stabilization parameter, and a stereo camera rig misalignment calibration parameter. For example, the stereo camera rig misalignment calibration parameter may be included in the camera parameter when the image data 11 is a S3D image.

In one embodiment, the camera parameter 12 may function as a sort of parameter for executing a command for the pose change of the virtual camera in response to the viewpoint change of the user.

Figure 4:
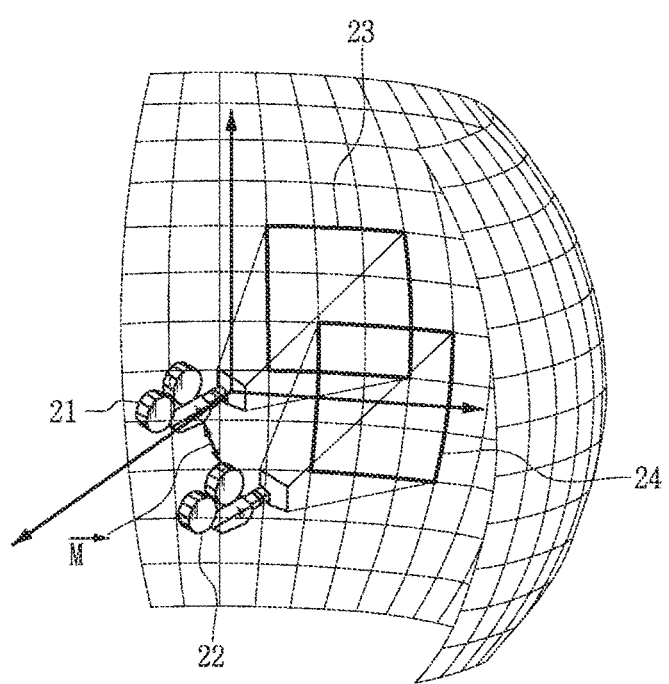
FIG. 4 is a diagram illustrating a scene and an operation of a virtual camera in a virtual space according to an embodiment.

FIG. 4 is a diagram illustrating a scene and an operation of the virtual camera in the virtual space according to an embodiment. As shown in FIG. 4, the scene constructing unit 300 may place the virtual camera in the virtual space using the image package, and construct a scene for the image data.

That is, the scene constructing unit 300 may texture the image data onto projection geometry 22 projected in the virtual space (R). The image data 11 is encoded when received by the communication interface unit 200, but may be decoded and textured by the scene constructing unit. The textured image is generally provided to the user through a display device. That is, according to the conventional methods, the location of the virtual camera is fixed and does not change in response to a motion of the user, and the virtual camera displays an image at a fixed view.

The virtual camera pose changing unit 400 according to an embodiment may change, using the motion data and the camera parameter, the pose of the placed virtual camera to respond to the viewpoint change of the user. Because the camera parameter 12 includes the camera lens parameter or the camera stabilization parameter of the real camera, the virtual camera pose changing unit 400 may control the location and orientation of the virtual camera in the virtual space using the camera parameter 12 and the motion data.

In one example, as shown in FIG. 4, for the textured image, a part of the image being inputted to the virtual camera may be an area 23. For example, the full image may not be inputted to the virtual camera when the image data 11 includes a wide viewing angle image, or based on the location of the virtual camera.

In this state, for example, when the viewpoint of the user is moved by turning the head down rightwards, the sensor unit 100 may sense the viewpoint movement of the user, and in response to the viewpoint movement of the user, the virtual camera pose changing unit 400 may change (in FIG. 4, move as much as a vector M) the pose of the virtual camera in the virtual space using the motion data and the camera parameter. Although FIG. 4 shows the location movement of the virtual camera, only the orientation of the virtual camera may be changed without a change in the location of the virtual camera in another embodiment. In still another embodiment, the location and the orientation may be changed together.

Referring to FIG. 4, when the virtual camera is placed in the pose 21, the part of the image being inputted to the virtual camera is the area 23, and in response to the viewpoint change of the user, the virtual camera pose changing unit 400 changes the pose of the virtual camera, so the virtual camera is moved to a pose 22 and the area being inputted to the virtual camera is moved to an area 24. As the area being inputted to the virtual camera changes with the change in the camera pose, the user may change the user's viewpoint and track and see a desired part of the image.

In another embodiment, the user viewpoint related image processing apparatus 1000 may further include the projection geometry generating unit 500 to generate projection geometry for output of a wide viewing angle image using the camera parameter of the real camera which captured the image of the image data. The projection geometry generating unit 500 may calibrate vertices or texture coordinates of reference geometry using the camera parameter, and may transform the calibrated reference geometry into a shape of curved surface to generate the projection geometry. As described in the foregoing, the camera parameter may include at least one of a lens parameter, a camera stabilization parameter, and a stereo camera rig misalignment calibration parameter. For example, the stereo camera rig misalignment calibration parameter may be included in the camera parameter when the image data is a S3D image.

Figure 5A:
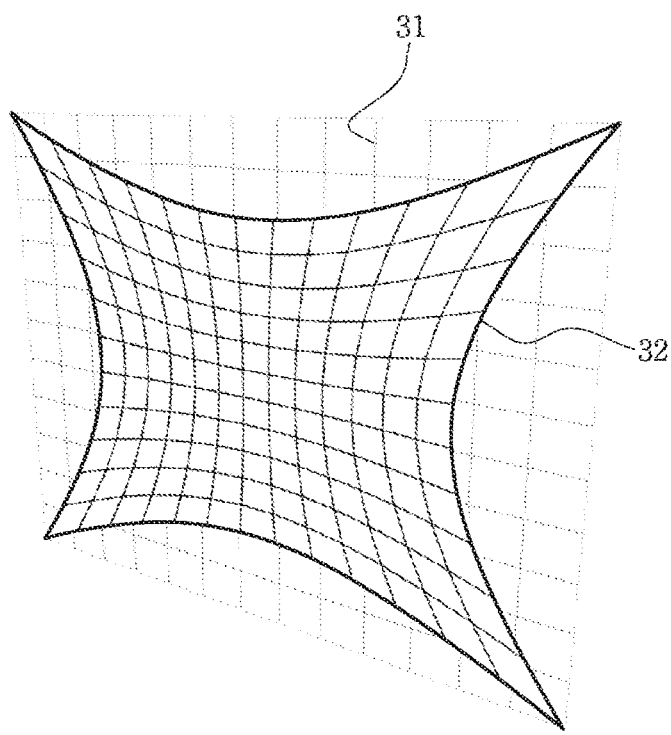
FIGS. 5A through 5E are diagrams illustrating projecting and texturing of projection geometry using a vertex transformation technique of projection geometry according to an embodiment.
Figure 5B:
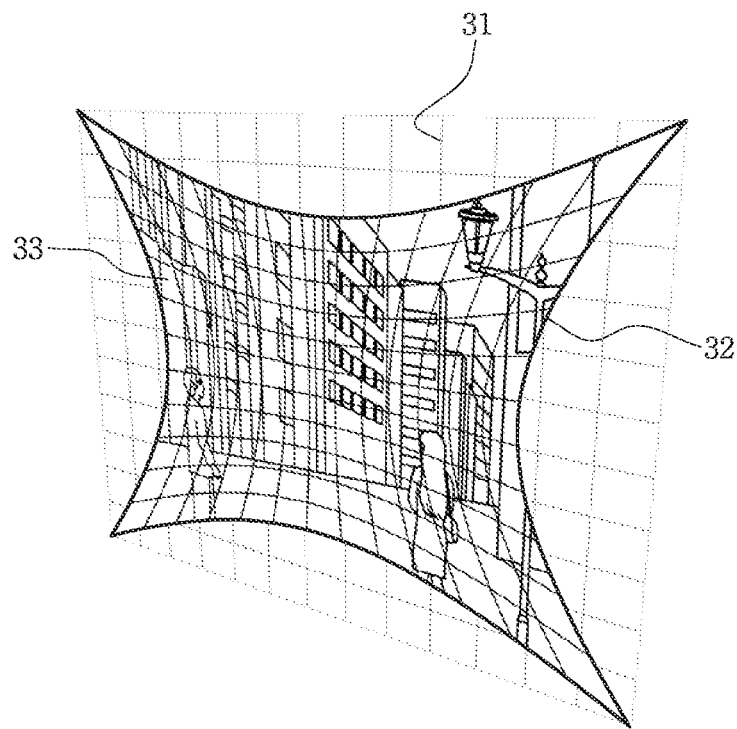

FIGS. 5A through 5E are diagrams illustrating projecting and texturing of projection geometry using a vertex transformation technique of projection geometry according to an embodiment. In one embodiment, the projection geometry generating unit 500 may transform the vertices of the reference projection geometry using the camera lens parameter to generate calibrated projection geometry. Referring to FIG. 5A, the generated projection geometry 32 is illustrated together with the reference projection geometry 31 being compared to. Referring to FIG. 5A, the projection geometry 32 with the transformed vertices appears to be biased toward the center, with curved edges. When texturing is performed on the generated projection geometry 32, the textured image is displayed without distortion as shown in FIG. 5B. For example, a straight line of an object is displayed as a straight line on the textured image.

Figure 5C:
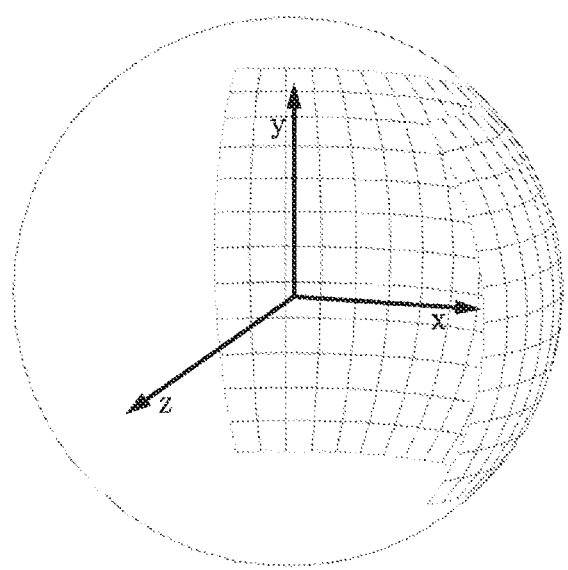
Figure 5D:
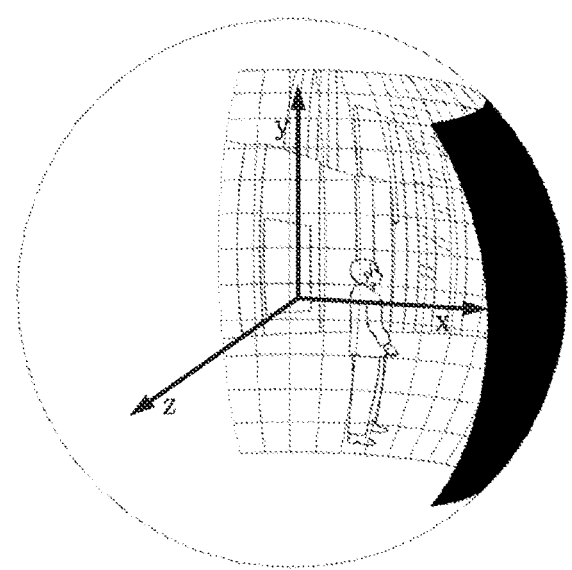
Figure 5E:
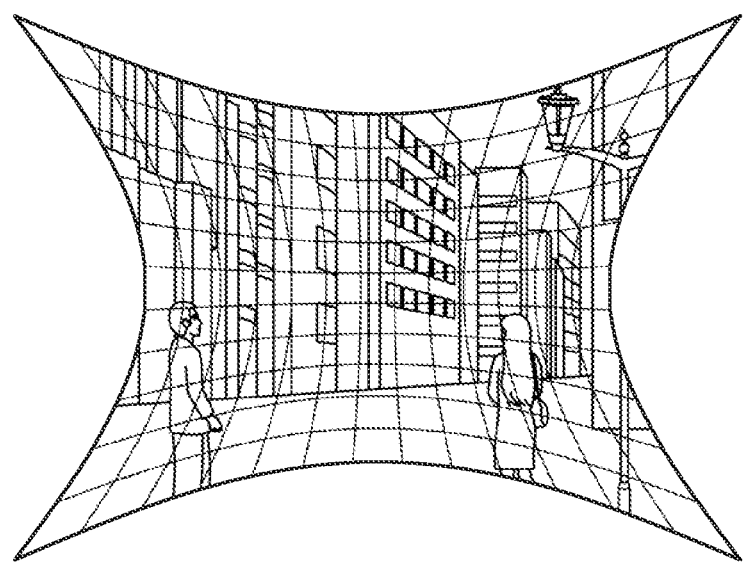

Referring to FIGS. 5C and 5D, the scene constructing unit 300 places the projection geometry 32 in the virtual space. In this case, by projecting the projection geometry onto an arbitrary curved surface of the virtual space, the projection geometry in the shape of an inward curved surface as shown in FIG. 5B may be displayed in an unfolded shape as shown in FIGS. 5C and 5D. FIG. 5D shows a textured state of the captured image onto the projected projection geometry, and FIG. 5E shows a displayed state of the textured image from the front at the same angle of view as an angle of view of the camera when capturing the image.

Figure 6A:
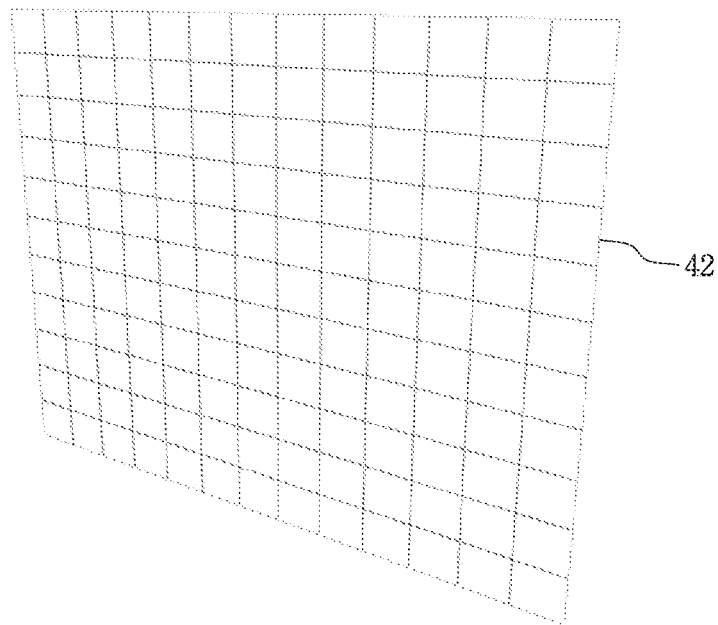
FIGS. 6A through 6E are diagrams illustrating projecting and texturing of projection geometry using a texture coordinate transformation technique of projection geometry according to an embodiment.
Figure 6B:
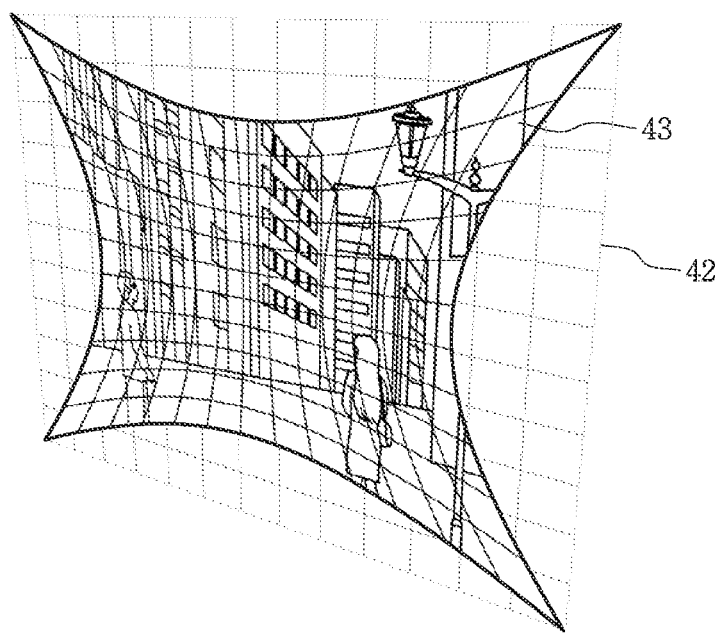

FIGS. 6A through 6E are diagrams illustrating projecting and texturing of projection geometry using a texture coordinate transformation technique of projection geometry according to an embodiment. The texture coordinates represent coordinates at which the image is textured, and is irrelevant to the shape of the projection geometry. Thus, as shown in FIG. 6A, the projection geometry 42 does not change in the shape of reference projection geometry. However, when the image is textured onto the projection geometry 42, the image 43 textured onto the projection geometry shows a concavely twisted shape, not a quadrangular shape, as shown in FIG. 6B.

Figure 6C:
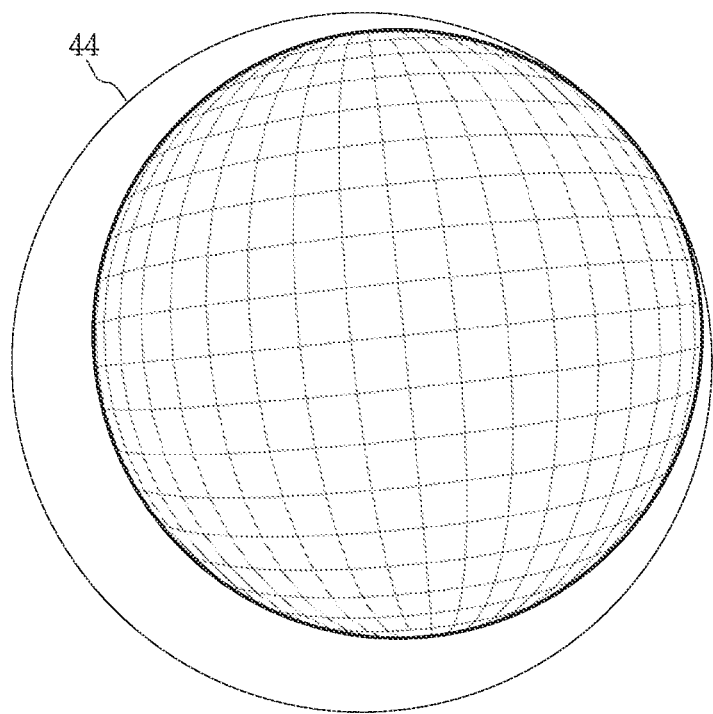
Figure 6D:
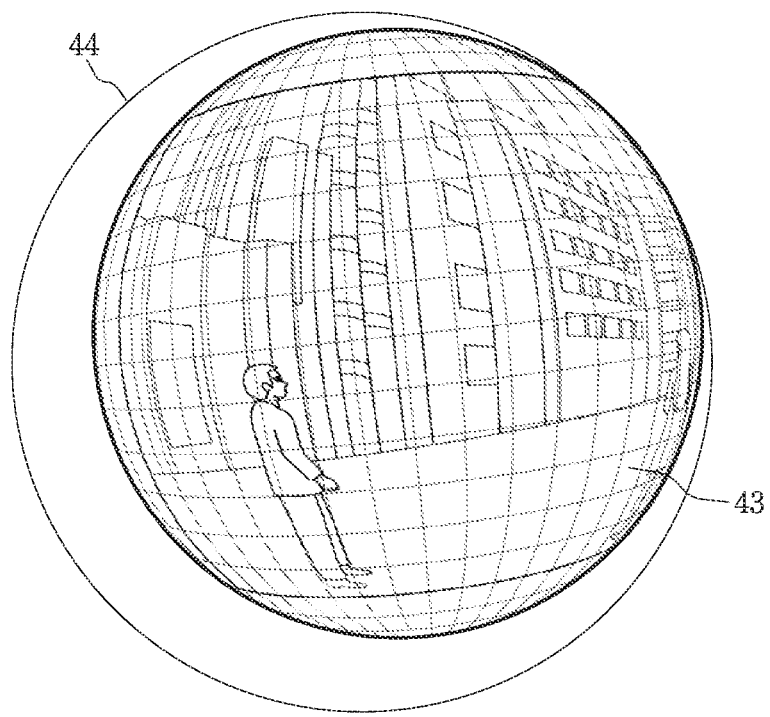
Figure 6E:
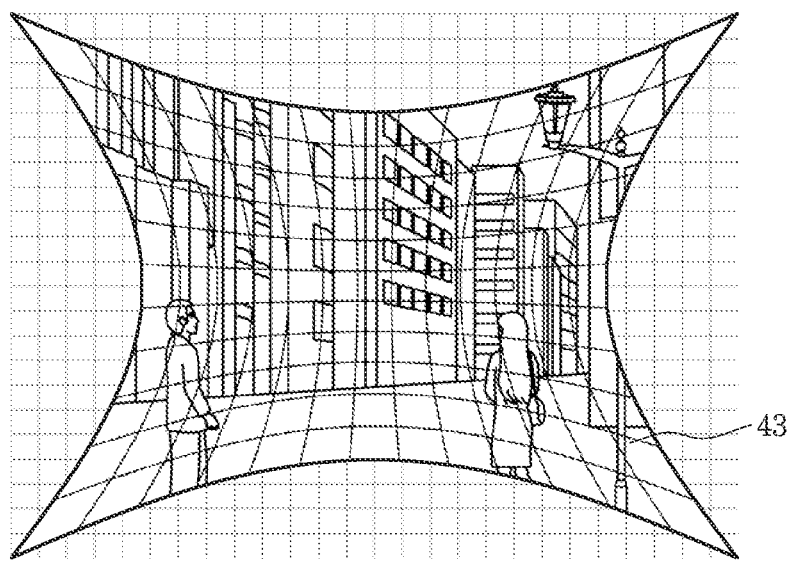

Referring to FIG. 6C, the projection geometry 44 with the calibrated texture coordinates is placed on the curved surface of the virtual space, and when the image 43 is textured onto the projection geometry 44 and rendering is executed, the image is outputted as shown in FIG. 6D. Also, FIG. 6E shows a displayed state of the textured image 43 from the front at the same angle of view as an angle of view of the camera when capturing the image. Through this process, a wide viewing angle image may be displayed on the curved surface of the virtual space without distortion.

In another embodiment, the scene constructing unit 300 may calibrate the scene by dynamically adjusting the location of the virtual camera in the virtual space using the camera parameter (for example, the camera lens parameter or the camera stabilization parameter) so that the calibrated image may be rendered. In one embodiment, the scene constructing unit 300 may calibrate the scene by transforming the projection geometry in a state that the virtual camera is fixed. For example, the scene constructing unit 300 may move the projection geometry upwards, downwards, leftwards, and rightwards, or in the directions defined by yaw, pitch, and roll.

Alternatively, the scene constructing unit 300 may calibrate the scene by dynamically adjusting the location of the virtual camera using the camera stabilization parameter. In this case, the location adjustment of the virtual camera may be made on a smaller scale than the viewpoint movement of the user, and adjustment of the virtual camera is made with an aim of distortion correction, which is different from the change in the part of the image being displayed with the viewpoint movement of the user.

In one embodiment, the user viewpoint related image processing apparatus 1000 may further include the image rendering unit 600 to render in real time at least a portion of the scene being seen by the virtual camera in the changed camera pose and display it on the display unit 700. The image rendering unit 600 serves to allow the user to actually see the image through the display unit 700.

In one example, the user viewpoint related image processing apparatus 1000 may further include the display unit 700, and the display unit 700 may include any display device such as a liquid crystal display (LCD), an organic light emitting diode (OLED), and a plasma display panel (PDP), and may be provided with a touch screen.

Figure 7:
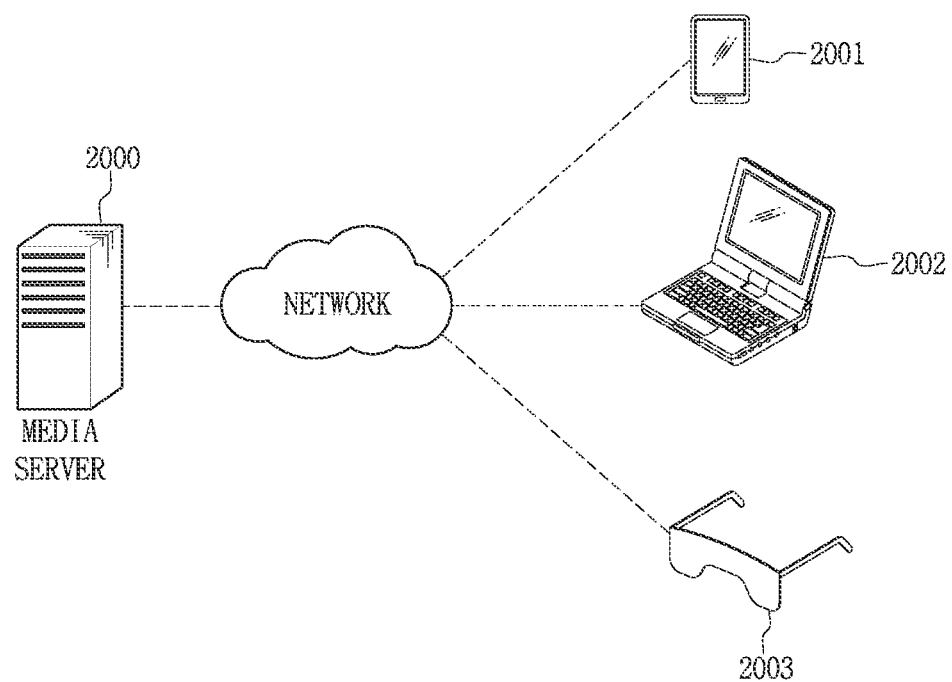
FIG. 7 is a diagram illustrating a network environment including a viewpoint related image providing media server according to an embodiment.

FIG. 7 is a diagram illustrating a network environment including the viewpoint related image providing media server according to an embodiment. The viewpoint related image providing media server 2000 may provide an image package to other device via a network. The other device may include, as shown in FIG. 7, various types of terminals such as a smart phone 2001, a laptop 2002, a head mounted display (HMD) device 2003, and smart glasses. In one embodiment, the other device may be included in the user viewpoint related image processing apparatus 1000 described in the foregoing. The pose of the virtual camera may include an orientation or location of the virtual camera, and the image data may be at least one of a wide viewing angle streaming image and a S3D image.

The viewpoint related image providing media server 2000 may include an image package storage unit which possesses an image package including image data and a camera parameter for pose change of a virtual camera, and a communication interface unit to transmit the image package to other terminal. The camera parameter is a parameter of a real camera which captured an image of the image data, and a specific description is the same as above.

Figure 8:
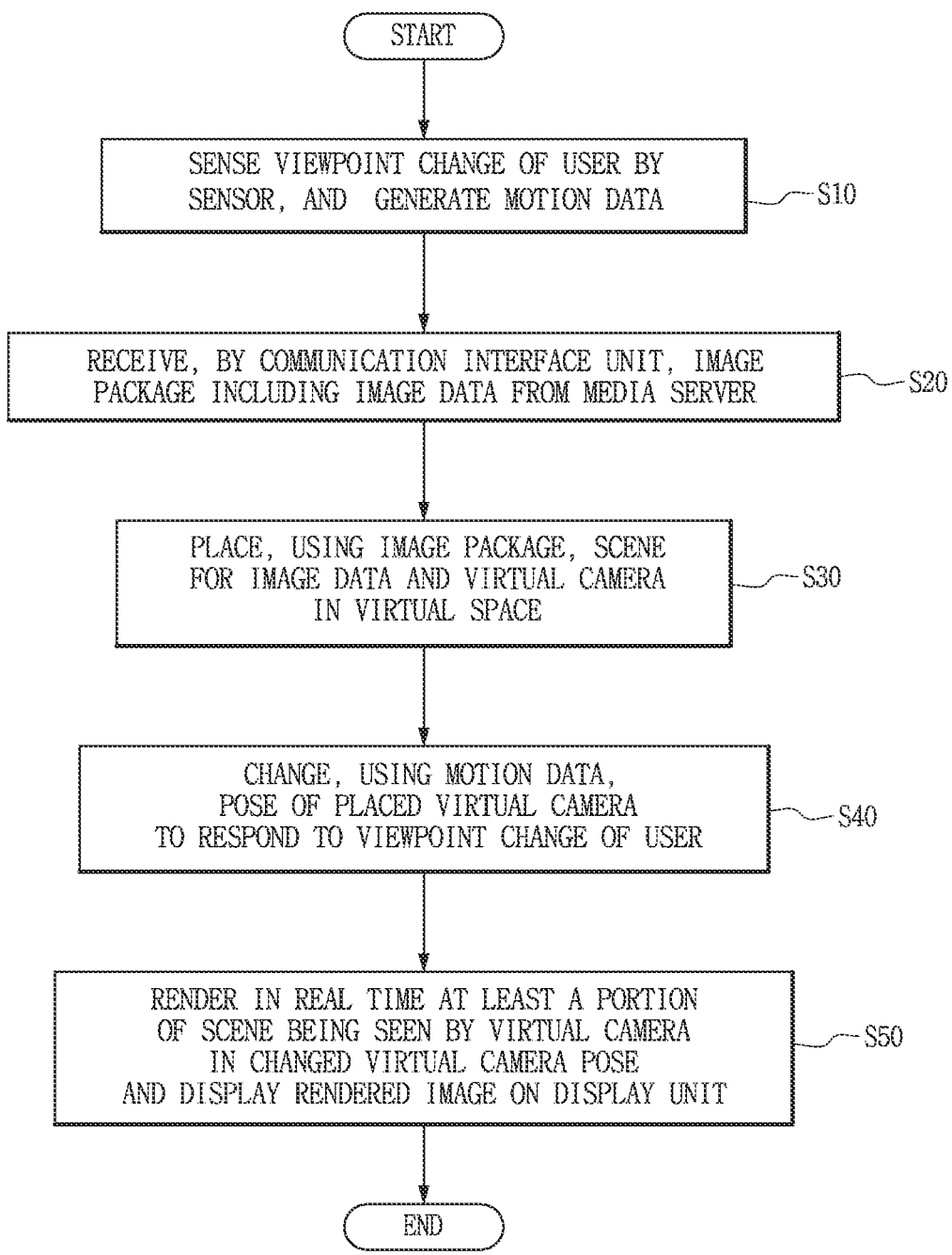
FIG. 8 is a flowchart illustrating a user viewpoint related image processing method according to an embodiment.

FIG. 8 is a flowchart illustrating a user viewpoint related image processing method according to an embodiment. Referring to FIG. 8, the user viewpoint related image processing method includes sensing, by the sensor, a viewpoint change of a user and generating motion data (S10), receiving, by the communication interface unit, an image package including image data from the media server (S20), placing, using the image package, a scene for the image data and a virtual camera in a virtual space (S30), and changing, using the motion data, a pose of the placed virtual camera to respond to the sensed viewpoint change of the user (S40). The pose of the virtual camera may include an orientation or location of the virtual camera. That is, in response to the viewpoint change of the user, the virtual camera may be moved close to or far away from the textured scene. Also, in response to the viewpoint change of the user, the orientation of the virtual camera may change.

In one embodiment, the image package may further include a camera parameter for the pose change of the virtual camera, and the camera parameter may be a parameter of a real camera which captured an image of the image data. Also, the image data may include a wide viewing angle streaming image.

In one embodiment, the changing of the pose of the placed virtual camera may include changing the pose of the virtual camera using the motion data and the camera parameter. The step may be performed by the virtual camera pose changing unit.

Also, the user viewpoint related image processing method may further include rendering in real time at least a portion of the scene being seen by the virtual camera at the changed virtual camera pose and displaying the rendered image on the display unit (S50).

According to the embodiments, when a user changes a viewpoint such as by turning a head, the part of the image being displayed may be changed to respond to the changed viewpoint. Thus, a separate input activity using a hand is not required. Further, as the part of the image being displayed changes with the viewpoint movement, an intuitive user experience may be provided as compared to conventional methods.

While the present disclosure has been hereinabove described with reference to the exemplary embodiments illustrated in the drawings, it is for the purpose of illustration only and those skilled in the art will appreciate that various changes in form and details may be made thereto. However, it should be understood that these changes fall within the technical scope of protection of the present disclosure. Therefore, the true technical scope of protection of the present disclosure should be defined by the technical aspects of the appended claims.

What is claimed is:

1. A user viewpoint related image processing apparatus comprising:
    a sensor configured to sense a viewpoint change of a user and generate motion data;
    a communication interface processor configured to receive an image package including image data from a media server;
    a scene constructing processor configured to, using the image package, place a virtual camera in a virtual space and construct a scene for the image data;
    a virtual camera pose changing processor configured to, using the motion data, change a pose of the placed virtual camera to respond to the viewpoint change of the user, and
    a projection geometry generating processor configured to generate a projection geometry for output of a wide viewing angle image using a camera parameter of a real camera which captured an image of the image data,
    wherein the projection geometry generating processor is configured to calibrate vertices or texture coordinates of reference geometry using the camera parameter to generate the projection geometry.

2. The apparatus according to claim 1, wherein the pose of the virtual camera includes an orientation of the virtual camera or a location of the virtual camera.

3. The apparatus according to claim 1, wherein the sensor configured to sense the viewpoint change of the user includes at least one of a gyro sensor, an acceleration sensor, an inertial measurement unit (IMU) sensor, a global positioning system (GPS) sensor, or a vision sensor.

4. The apparatus according to claim 1, wherein the image package further includes a camera parameter for the pose change of the virtual camera, and wherein the camera parameter is a parameter of a real camera which captured an image of the image data.

5. The apparatus according to claim 4, wherein the virtual camera pose changing is configured to change the pose of the placed camera using the motion data and the camera parameter.

6. The apparatus according to claim 4, wherein the camera parameter includes at least one of a camera lens parameter, a camera stabilization parameter, and a stereo camera rig misalignment calibration parameter.

7. The apparatus according to claim 1, wherein the image data includes at least one of a wide viewing angle streaming image or a stereoscopic 3D (S3D) image.

8. The apparatus according to claim 1, wherein the camera parameter includes at least one of a camera lens parameter, a camera stabilization parameter, or a stereo camera rig misalignment calibration parameter.

9. The apparatus according to claim 1, wherein the scene constructing processor is configured to calibrate the scene by dynamically adjusting a location of the virtual camera using a camera stabilization parameter.

10. The apparatus according to claim 1, further comprising:
    an image rendering processor configured to render in real time at least a portion of the scene being seen by the virtual camera in the changed camera pose and display a rendered image on a display processor.

11. A user viewpoint related image processing method comprising:
    sensing a viewpoint change of a user by a sensor and generating motion data;
    receiving, by a communication interface processor, an image package including image data from a media server;
    placing, using the image package, a scene for the image data and a virtual camera in a virtual space; and
    changing, using the motion data, a pose of the placed virtual camera to respond to the viewpoint change of the user,
    generating a projection geometry for output of a wide viewing angle image using a camera parameter of a real camera which captured an image of the image data,
    wherein the generating a projection geometry for output of a wide viewing angle image comprising calibrating vertices or texture coordinates of reference geometry using the camera parameter to generate the projection geometry.

12. The method according to claim 11, wherein the pose of the virtual camera includes an orientation of the virtual camera or a location of the virtual camera.

13. The method according to claim 11, wherein the image package further includes a camera parameter for the pose change of the virtual camera, and wherein the camera parameter is a parameter of a real camera which captured an image of the image data.

14. The method according to claim 13, wherein the changing of the pose of the placed virtual camera comprises changing the pose of the virtual camera using the motion data and the camera parameter.

15. The method according to claim 11, wherein the image data includes at least one of a wide viewing angle streaming image or a stereoscopic 3D (S3D) image.

16. The method according to claim 11, further comprising:

rendering in real time at least a portion of the scene being seen by the virtual camera in the changed virtual camera pose and displaying a rendered image on a display.

* * * * *